(12) United States Patent
Ehret et al.

(10) Patent No.: US 7,694,420 B2
(45) Date of Patent: Apr. 13, 2010

(54) COAXIAL CABLE PREPARATION TOOL AND METHOD OF USE THEREOF

(75) Inventors: Trevor Ehret, Syracuse, NY (US); Shawn Chawgo, Cicero, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 244 days.

(21) Appl. No.: 11/779,967

(22) Filed: Jul. 19, 2007

(65) Prior Publication Data

US 2009/0019704 A1    Jan. 22, 2009

(51) Int. Cl.
*H02G 1/12* (2006.01)
(52) U.S. Cl. .............................. 30/90.1; 30/90.6; 81/9.4
(58) Field of Classification Search ................. 30/90.1, 30/90.2, 90.4, 90.6, 90.7, 90.8, 91.1, 91.2; 81/9.4–9.44; 29/566.4
See application file for complete search history.

(56) References Cited

U.S. PATENT DOCUMENTS

| | | | |
|---|---|---|---|
| 3,304,605 A | | 2/1967 | Stark |
| 3,659,483 A | | 5/1972 | Matthews |
| 4,345,375 A | * | 8/1982 | Hayward .................... 30/90.1 |
| 4,459,881 A | | 7/1984 | Hughes, Jr. |
| 4,559,704 A | | 12/1985 | Michael, III |
| 4,729,268 A | | 3/1988 | Morrow |
| 4,777,712 A | | 10/1988 | Dyck et al. |
| 4,934,219 A | | 6/1990 | Edwards |
| 4,979,299 A | * | 12/1990 | Bieganski .................... 30/90.1 |
| 5,023,995 A | * | 6/1991 | Kaplan ........................ 30/90.1 |
| 5,074,043 A | | 12/1991 | Mills |
| 5,511,305 A | * | 4/1996 | Garner ........................ 30/90.4 |
| 5,669,276 A | | 9/1997 | Spacek |
| 5,749,270 A | * | 5/1998 | Bourbeau ..................... 81/9.4 |
| 6,381,850 B1 | * | 5/2002 | Warner ........................ 30/90.6 |
| 6,397,474 B1 | | 6/2002 | Losinger |
| 6,467,171 B2 | | 10/2002 | Tarpill |

(Continued)

FOREIGN PATENT DOCUMENTS

JP            05219624        *  8/1993

OTHER PUBLICATIONS

Andrew Installation Tools, www.andrew.com/search/BN_PA-100414.2-EN.aspx. Andrew Corporation, Orlando Park, Illinois.

(Continued)

*Primary Examiner*—Stephen Choi
(74) *Attorney, Agent, or Firm*—Schmeiser, Olsen & Watts, LLP (57) ABSTRACT

A coaxial cable preparation tool is provided wherein the tool includes a body, having a first end and a second end, the first end including a first cavity configured to accommodate insertion of a coaxial cable therein. An outer conductor blade is located near the first end of the body and is movably operable with the body to cut an outer jacket, an outer conductor, and an inner dielectric of the cable when the cable is inserted into the first cavity. A center conductor chamfering member is positioned at the back of a second cavity, the second cavity extending from the second end of the body. A dielectric coring blade is positioned within the second cavity, and a jacket stripping blade is positioned at least partially within the second cavity. A corresponding method of coaxial cable preparation is provided.

16 Claims, 8 Drawing Sheets

U.S. PATENT DOCUMENTS

| | | | |
|---|---|---|---|
| 6,510,610 B2 * | 1/2003 | Losinger | 30/90.2 |
| 6,513,244 B1 * | 2/2003 | Andreescu | 30/90.2 |
| 6,530,152 B1 | 3/2003 | Christensen et al. | |
| 6,618,945 B2 | 9/2003 | Holland et al. | |
| 6,637,101 B2 | 10/2003 | Hathaway et al. | |
| 6,640,439 B2 | 11/2003 | Losinger | |
| 6,668,459 B2 | 12/2003 | Henningsen | |
| 6,725,533 B1 | 4/2004 | Losinger | |
| 2002/0124410 A1 * | 9/2002 | Tarpill | 30/90.1 |
| 2004/0221456 A1 * | 11/2004 | Losinger | 30/90.1 |
| 2005/0115074 A1 | 6/2005 | Gialenios et al. | |

OTHER PUBLICATIONS

Lemco Tool Catalog, p. 44, www.lemco-tool.com/PDF/LEMCOTEXT.pdf.

\* cited by examiner

COAXIAL CABLE PREPARATION TOOL AND METHOD OF USE THEREOF

BACKGROUND OF INVENTION

1. Technical Field

This invention relates generally to the field of tools for preparing coaxial cables. More particularly, this invention provides for a coaxial cable preparation tool configured to substantially simultaneously strip the outer jacket of the cable, core the inner dielectric of the cable, and chamfer the center conductor of the cable, and a corresponding method of use thereof.

2. Related Art

Coaxial cables have become an increasingly prevalent form of electromagnetic information exchange and are common conduits for transmission of electromagnetic communications. Cable preparation tools are useful in preparing cable ends for efficient connection of the cables to cable connection components.

There are many coaxial cable preparation tools available for use in preparing coaxial cable ends. In order to accomplish different preparation steps, multiple cable preparation tools are often needed to execute each step, or known cable preparation tools include several separately operable components necessary to execute each cable preparation step. These additional tools and/or tool components add to the cost and complexity of the typical cable preparation tools and increase the time spent preparing coaxial cables. Accordingly, there is a need in the field of coaxial cable preparation tools for an improved tool design.

SUMMARY OF INVENTION

The present invention provides a coaxial cable preparation tool for use with coaxial cables that offers improved reliability.

A first general aspect of the invention provides a coaxial cable preparation tool comprising: a body, having a first end and a second end, the first end including a first cavity configured to accommodate insertion of a coaxial cable therein; an outer conductor blade, pivotally mounted near the first end of the body and movably operable with the body to cut an outer jacket, an outer conductor, and an inner dielectric of the cable when the cable is inserted into the first cavity, defining a first cut portion with the outer jacket, outer conductor and inner dielectric removed from the cable; a center conductor chamfering member, positioned at the back of a second cavity, the second cavity extending from the second end of the body; a dielectric coring blade, positioned within the second cavity; and a jacket stripping blade, positioned at least partially within the second cavity, wherein upon insertion of the first cut portion into the second cavity and rotating the body with respect to the cable, a chamfer is defined on an end of the center conductor substantially simultaneously with the removal of a portion of the inner dielectric and a portion of the outer jacket.

A second general aspect of the invention provides a coaxial cable preparation tool comprising: a body, having a first cavity extending axially from a first end of the body, wherein an outer conductor blade is operably connected to the body, the outer conductor blade being movable from a first non-cutting position external to the first cavity to a second cutting position wherein the outer conductor blade extends to a depth within the first cavity sufficient to cut an outer jacket, an outer conductor, and an inner dielectric of a coaxial cable inserted into the first cavity; the body having a second cavity extending axially from a second end of the body, wherein a center conductor chamfering member is located at the back of the second cavity, a coring blade is located within the second cavity, and a jacket stripping blade extends partially into the second cavity.

A third general aspect of the invention provides a coaxial cable preparation tool comprising: a body, having a first end and an opposing second end, the first end including a first cavity and the second end including a second cavity; an outer conductor blade, located perpendicular to an axis of the body, the outer conductor blade operable to move from a non-cutting position external to the first cavity to a cutting position, wherein at least a portion of the outer conductor blade resides within the first cavity; and means for simultaneously chamfering a center conductor of a coaxial cable, coring an inner dielectric of the coaxial cable, and stripping an outer jacket of the coaxial cable, the means located within the second cavity.

A fourth general aspect of the invention provides a coaxial cable preparation method comprising: a) providing a body, the body having a first cavity and a second cavity; b) inserting an end of a coaxial cable into the first cavity and then compressing an outer conductor blade and rotating the cable and the outer conductor blade with respect to each other to cut through a portion of the inserted cable, the cut portion of the cable including an outer jacket, an outer conductor, and an inner dielectric; c) removing the cut portion of the cable; d) inserting the cable end into the second cavity; e) stripping the outer jacket of the cable with a jacket stripping blade; f) coring the inner dielectric of the cable with a coring blade; and g) chamfering the center conductor of the cable with a chamfering member; wherein steps e-g occur substantially simultaneously by rotating the cable and the body with respect to each other while the cable is inserted within the second cavity.

The foregoing and other features of the invention will be apparent from the following more particular description of various embodiments of the invention.

BRIEF DESCRIPTION OF THE DRAWINGS

Some of the embodiments of this invention will be described in detail, with reference to the following figures, wherein like designations denote like members, wherein.

DETAILED DESCRIPTION OF THE INVENTION

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

Figure 1:
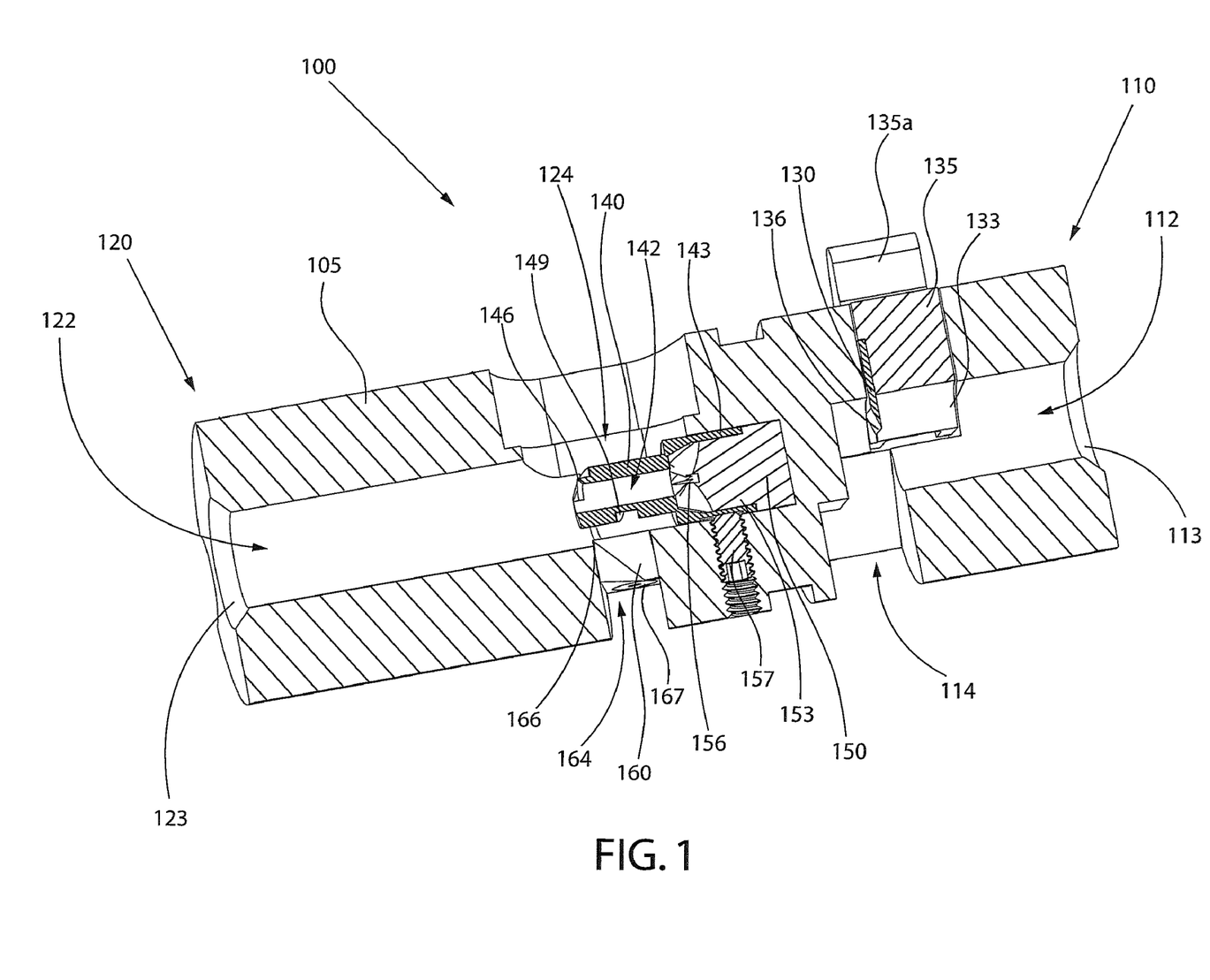
FIG. 1 depicts a perspective cross-section view of an embodiment of a coaxial cable preparation tool, in accordance with the present invention.

Referring to the drawings, FIG. 1 depicts a perspective cross-section view of an embodiment of a coaxial cable preparation tool 100. The coaxial cable preparation tool 100 comprises a body 105. The tool body 105 may be integrally formed of a singe piece of material, such as a rod, or the body 105 may be formed of multiple component elements joined, coupled, or otherwise attached together. The tool body 105 includes a first end 110 and a second end 120. The first 110 and second 120 ends may be located at opposite ends of a central axis of the tool body 105. The body 105 may be generally cylindrically shaped. However, the ends 110, 120 need not be axially aligned and the body may take on any shape operable to appropriately prepare a coaxial cable in accordance with the present invention.

Extending from the first end 110 and into the tool body 105 is a first cavity 112. The first cavity 112 may extend substantially along a central axis of the tool body 105. However, the first cavity 112 need not be axially aligned. The first cavity 112 is sized sufficiently and configured to accommodate insertion of a coaxial cable 10 (see FIGS. 6a-d). Hence, the first cavity 112 should have a diameter that is larger than the outer diameter of a coaxial cable 10. The entrance to the first cavity 112 may be chamfered 113 to facilitate more efficient and easy insertion of a coaxial cable 10 into the first cavity 112. A first view-and-extraction hole 114 may be cut through a side of the tool body 105 and may open into the first cavity 112. The first view-and-extraction hole 114 may permit user-viewing of a coaxial cable 10 when the cable 10 is inserted into the first cavity 112. Moreover, the first view-and-extraction hole 114 may also help facilitate extraction of cut portions of the cable 10 through the first view-and-extraction hole 114 if necessary. The first cavity 112 and/or the first view-and-extraction hole 114 may be formed by cutting, drilling, milling, boring or otherwise physically forming the cavity 112 and/or hole 114 into the body 105. Moreover, the first cavity 112 and/or first view-and-extraction hole 114 may be integrally molded or formed with the tool body 105.

Figure 3:
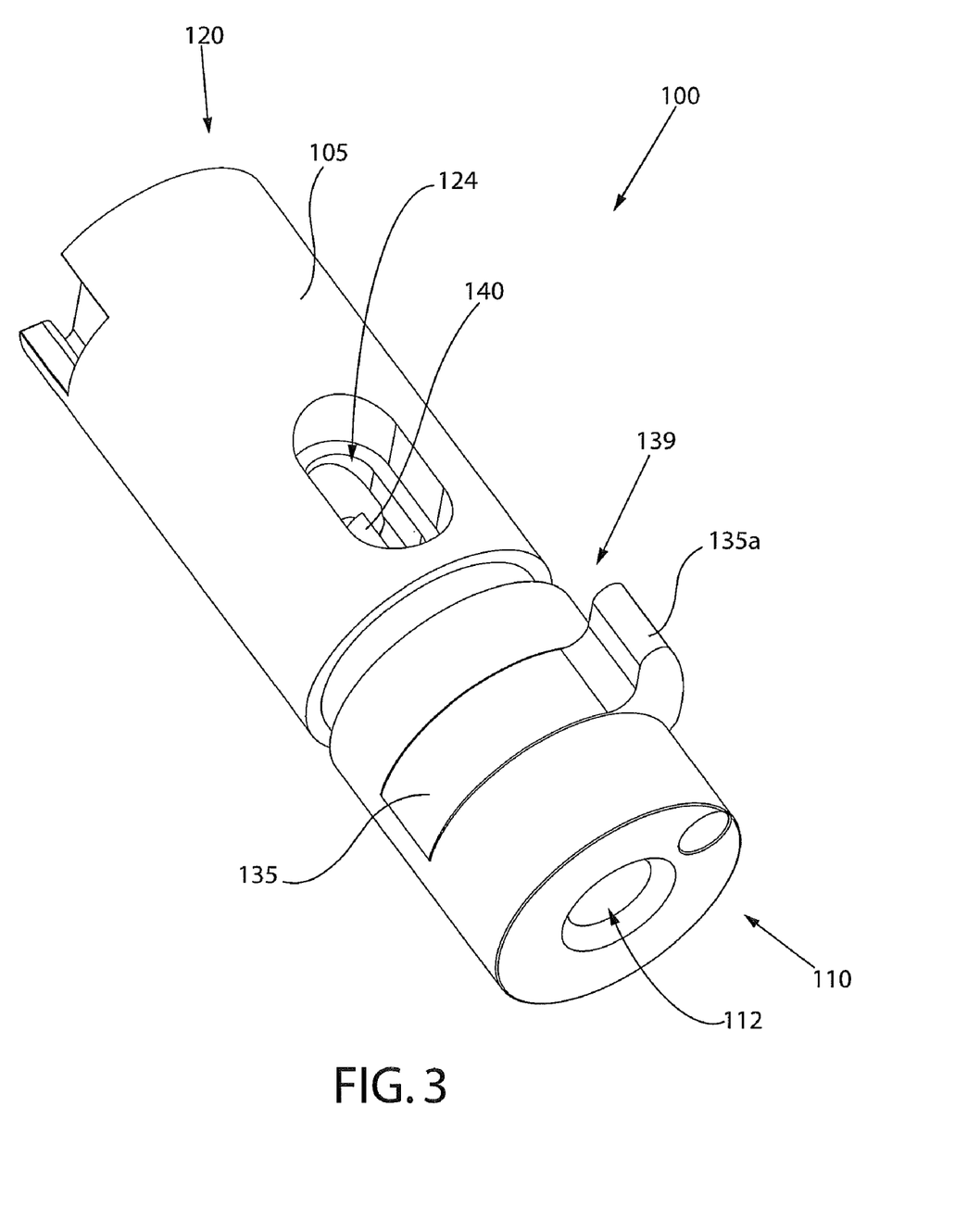
FIG. 3 depicts a perspective view of an embodiment of coaxial cable preparation tool with an outer conductor blade located in a second cutting position, in accordance with the present invention.
Figure 4:
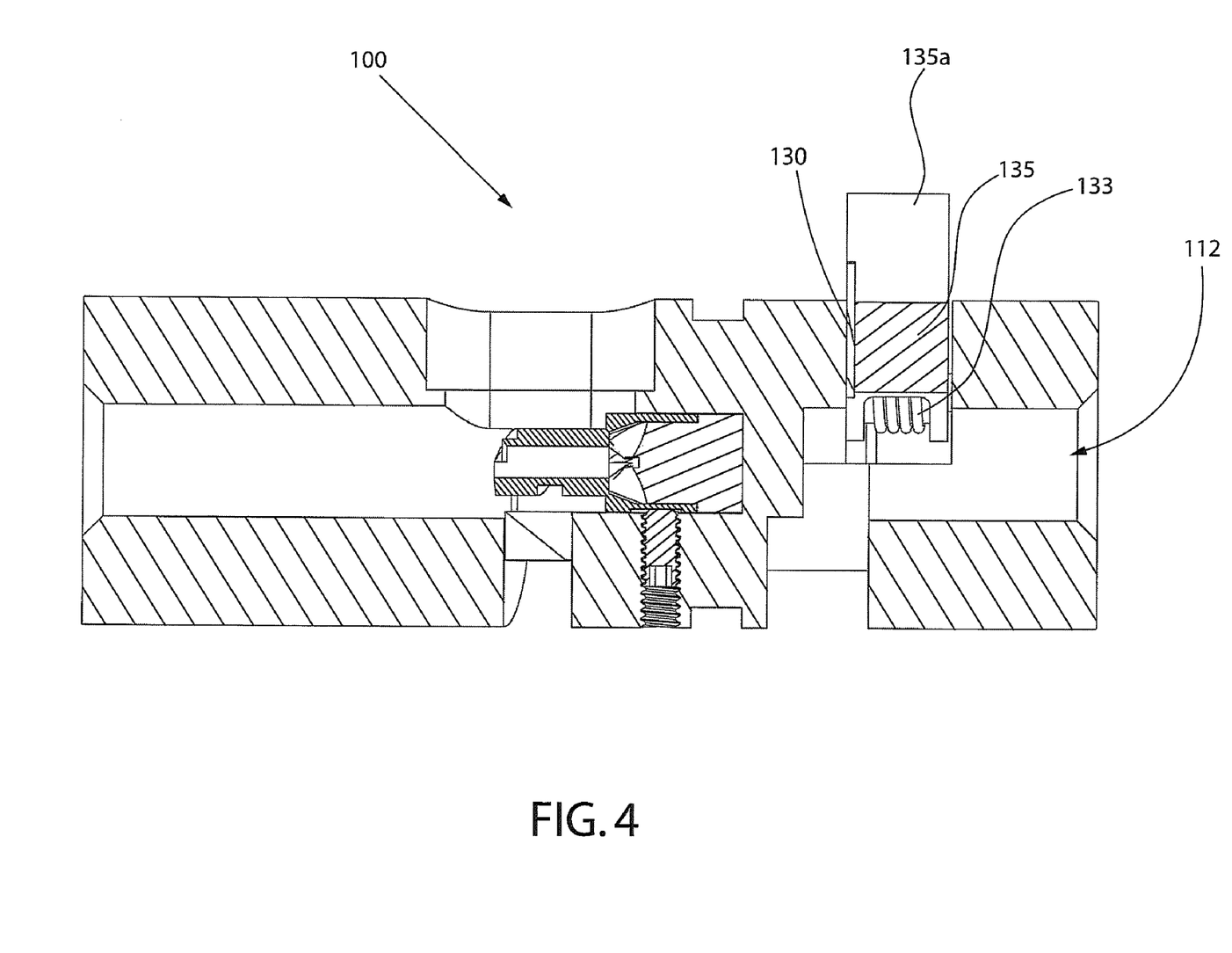
FIG. 4 depicts a side cross-section view of an embodiment of a coaxial cable preparation tool having a spring biased outer conductor blade, in accordance with the present invention.
Figure 5:
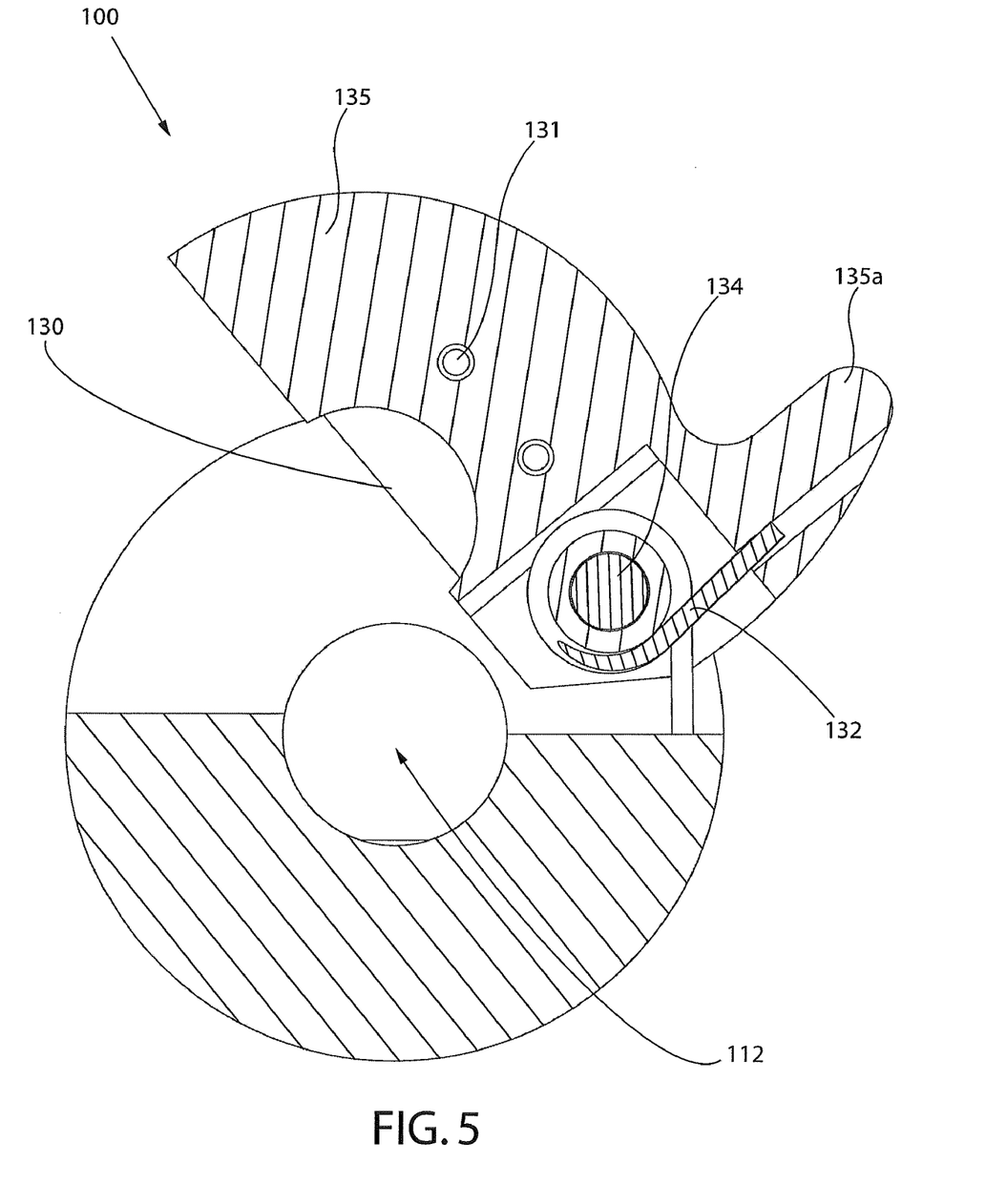
FIG. 5 depicts a front cross-section view of the embodiment of the coaxial cable preparation tool of FIG. 4 having a spring biased outer conductor blade, in accordance with the present invention.

With further reference to FIG. 1 and additional reference to FIGS. 2-6b, an outer conductor blade 130 is located near the first end 110 of the tool body 105. The outer conductor blade 130 may be movably operable with the body 105 to cut an outer jacket 12, a corrugated outer conductor 14, and an inner dielectric 16 of the cable 10, when the cable 10 is inserted into the first cavity 112. The outer conductor blade may have a cutting edge 136 sharp enough to pierce and cut through a portion 19 of the coaxial cable 10. The outer conductor blade 130 may be attached to a chopping arm 135. The outer conductor blade 130 may be separately mounted to the chopping arm 135 or may be integrally formed with or joined to the chopping arm 135. Moreover, the outer conductor blade 130 may be removable from the chopping arm 135 facilitating outer conductor blade 130 replacement. For example, the outer conductor blade 130, may be screwed onto the chopping arm 135 with a pair of screws 131, as depicted in FIG. 5. Additionally, the chopping arm 135 may be hingedly attached to the tool body 105, such as by a hinge pin 134 as shown in FIG. 5, allowing the arm 135 to swing and pivot in relation to the body 105 and provide for chopping and cutting operation of the outer conductor blade 130 as the blade 130 is moved into the first cavity 112 and against the inserted coaxial cable 10.

Figure 2:
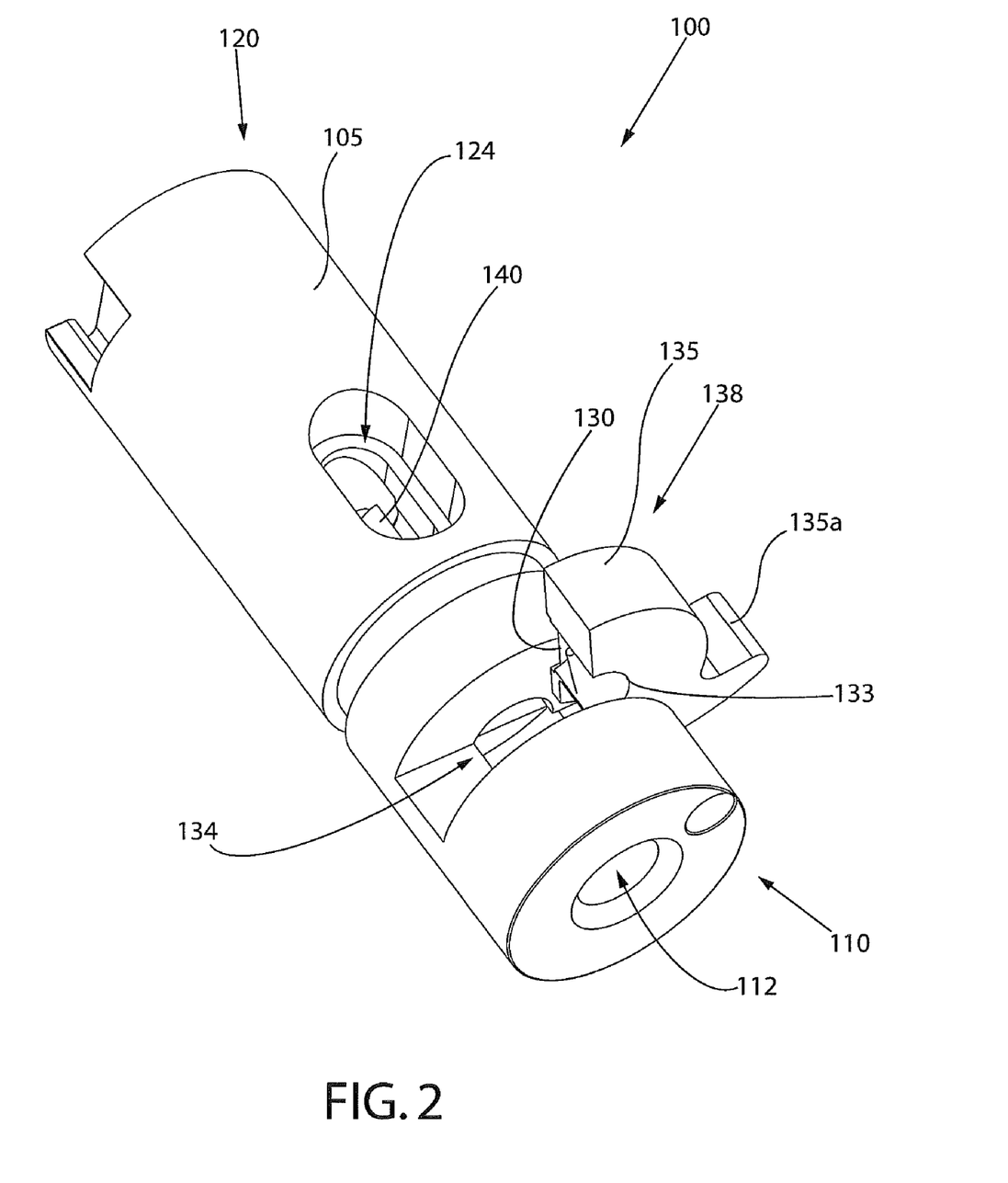
FIG. 2 depicts a perspective view of an embodiment of coaxial cable preparation tool with an outer conductor blade located in a first non-cutting position, in accordance with the present invention.

Furthermore, as depicted in FIGS. 2-3, an outer conductor blade 130 is operably connected to the body 105 such that the outer conductor blade 130 is movable from a first non-cutting position 138, wherein the blade 130 is external to the first cavity 112, to a second cutting position 139 wherein the outer conductor blade 130 extends to a depth within the first cavity sufficient to cut the outer jacket 12, the outer conductor 14, and the inner dielectric 16 of the coaxial cable 10, when the cable 10 is inserted into the first cavity 112. In addition, the chopping arm 135 may include a lever element 135a, such as a stub, a nub, a protrusion, a handle, a grip, a hold, or other physical feature that may be connected to the chopping arm 135, so that a user can grasp the lever element 135a and more easily move the chopping arm 135 between a first non-cutting position 138 and a second cutting position 139 as operable with the tool body 105. Still further, the chopping arm 135 may include a contoured inner surface 133. The contoured inner surface 133 of the chopping arm may be shaped to conform to the outer diameter of a coaxial cable 10 as it is received into the first cavity 112. In addition the contoured inner surface 133 of the chopping arm 135 may assure that the primary cable preparation tool 100 component that contacts and cuts a coaxial cable 10 received into the first cavity 112 is the outer conductor blade 130.

Embodiments of a coaxial cable preparation tool 100 may include a spring biased outer conductor blade 130. For example, the outer conductor blade 130 may be resiliently operable with the body 105, the chopping arm 135 being spring biased to exert a force toward the first cavity 112 assisting movement of the blade 130 to a second cutting position 139, wherein a portion of the coaxial cable 10 inserted within the first cavity 112 is cut by the blade 130. As depicted in FIGS. 4 and 5, a spring may be positioned with the hinged chopping arm 135 to provide a bias force in the pivot direction of the outer conductor blade 130 as it closes toward the first cavity 112. A spring biased chopping arm 135 helps ensure a uniform blade pressure on coaxial cable 10 so as not to deform the corrugations of outer conductor 14 (see FIGS. 6a-d and 8a-c). Additionally, the outer conductor blade 130 may be resiliently operable with the body 105, the chopping arm 135 being spring biased to exert a force away from the first cavity 112 assisting movement of the blade 130 to a first non-cutting position 138, wherein the blade is positioned outside of the first cavity 112, thereby not contacting the coaxial cable 10 inserted within the first cavity 112. As such the spring 132 would be reversed to provide and outward for in the pivot direction of the outer conductor blade 130 as it opens away from the first cavity 112. Still further embodiments may incorporated a spring 132 working directly upon a pivotally mounted outer conductor blade 130 to assert a bias force onto the blade 130.

Figure 6A:
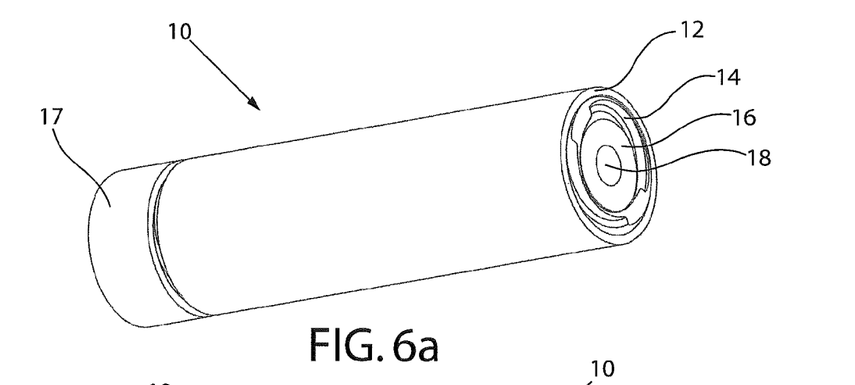
FIG. 6a depicts a perspective view of an embodiment of a coaxial cable just following cutting by an outer conductor blade of an embodiment of a coaxial cable preparation tool, in accordance with the present invention.
Figure 6B:
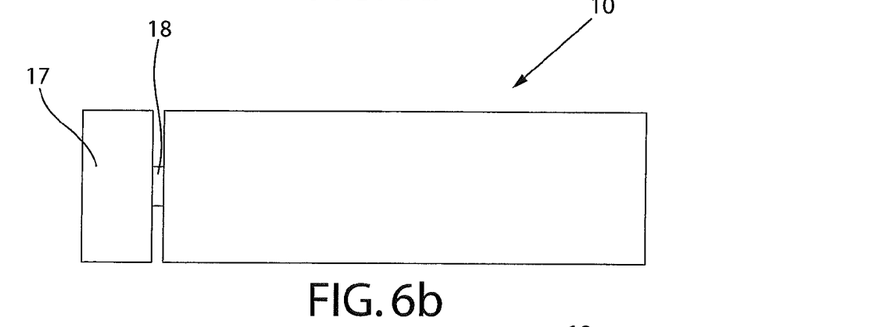
FIG. 6b depicts a side view of an embodiment of a coaxial cable just following cutting by an outer conductor blade of an embodiment of a coaxial cable preparation tool, in accordance with the present invention.
Figure 6C:
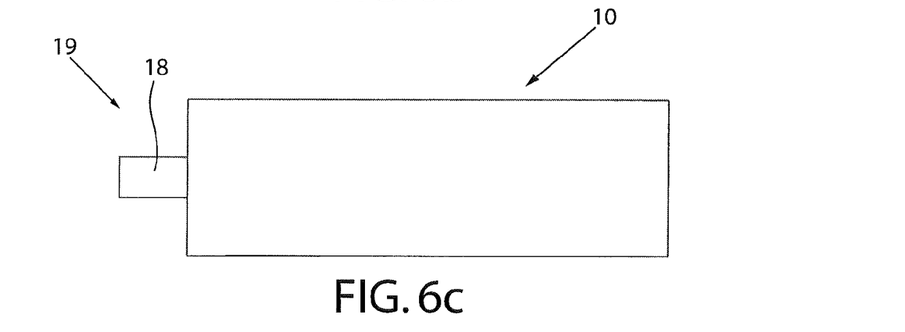
FIG. 6c depicts a side view of an embodiment of a coaxial cable having a cut portion removed, the cut portion having been cut by an embodiment of an outer conductor blade of an embodiment of a coaxial cable preparation tool, in accordance with the present invention.
Figure 6D:
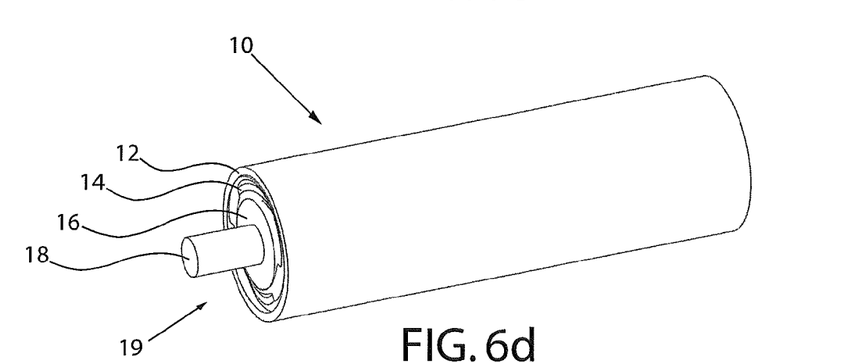
FIG. 6d depicts a side perspective view of an embodiment of a coaxial cable having a portion comprising an outer jacket, outer conductor and inner dielectric being cut and removed.

Referring further to FIGS. 1-6b and additionally to FIGS. 6c and 6d, a coaxial cable 10 is shown following cutting by an outer conductor blade 130 of an embodiment of a coaxial cable preparation tool 100. When an end of the cable 10 is inserted into the first cavity 112 and the outer conductor blade 130 is maneuvered into a second cutting position 139 then the cable 10 and the preparation tool 100 may be rotated with respect to each other so that the outer conductor blade 130 slices around the cable 10 and fully cuts a discardable portion 17 of the cable 10 including the outer jacket 12, outer conductor 14 and inner dielectric 16, thereby defining and leaving a first cut portion 19 of the end of the coaxial cable 10. Outer conductor blade 130 makes no contact with inner conductor 18 (see FIG. 6b). It may be possible for a user to view the cable 10 as it is partially cut by looking through the first view-and-extraction hole 114.

Once the discardable portion 17 of the cable 10 is cut, then the cut discardable portion 17 may be removed and discarded leaving the first cut portion 19 of the end of the coaxial cable 10. The removal of the discardable cable portion 17 may be through the first view-and-extraction hole 114 by pulling the cable 10 out of the first cavity 112 with the outer conductor blade 130 still in a second cutting position, thereby keeping the discardable portion 17 from moving back out of the first cavity 112 toward the first end of the tool body 110. However, the discardable cable portion 17 may also be retained on the cable 10 by maneuvering the outer conductor blade 130 to a first non-cutting position out of the way of the discardable portion 17 as the coaxial cable is slid back out of the first cavity 112. Then the previously cut discardable portion 17 may be simply removed by a user once the cable 10 is outside of the cable preparation tool 100. When the end of the coaxial cable 10 has been properly cut and defined as a first cut portion 19, then only a portion of the center conductor 18 extends a distance away from the main uncut body of the cable 10 (see FIGS. 6c and 6d). The distance of exposed center conductor 18 may be varied by changing the location of the outer conductor blade 130 in relation to the back end of the first cavity 112.

Referring again to FIG. 1, a coaxial cable preparation tool 100 includes a second cavity 122, wherein the second cavity extends from the second end 120 of the tool body 105 into the tool body 105. The second cavity 122 may extend substantially along a central axis of the tool body 105. However, the second cavity 122 need not be axially aligned. The second cavity 122 is sized sufficiently and configured to accommodate insertion of a coaxial cable 10 (see FIG. 7). Hence, the second cavity 122 should have a diameter that is larger than the outer diameter of the coaxial cable 10. The entrance to the second cavity 122 may be chamfered 123 to facilitate more efficient and easy insertion of the coaxial cable 10 into the second cavity 122. A second view-and-extraction hole 124 may be cut through a side of the tool body 105 and may open into the second cavity 122. The second view-and-extraction hole 124 may permit user-viewing of the coaxial cable 10 when the cable 10 is inserted into the second cavity 122. Moreover, the second view-and-extraction hole 124 may also help facilitate extraction of cut portions of the cable 10 through the second view-and-extraction hole 124 if necessary. The second cavity 122 and/or the second view-and-extraction hole 124 may be formed by cutting, drilling, milling, boring or otherwise physically forming the cavity 122 and/or hole 124 into the body 105. Moreover, the second cavity 122 and/or second view-and-extraction hole 124 may be integrally molded or formed with the tool body 105.

Figure 7:
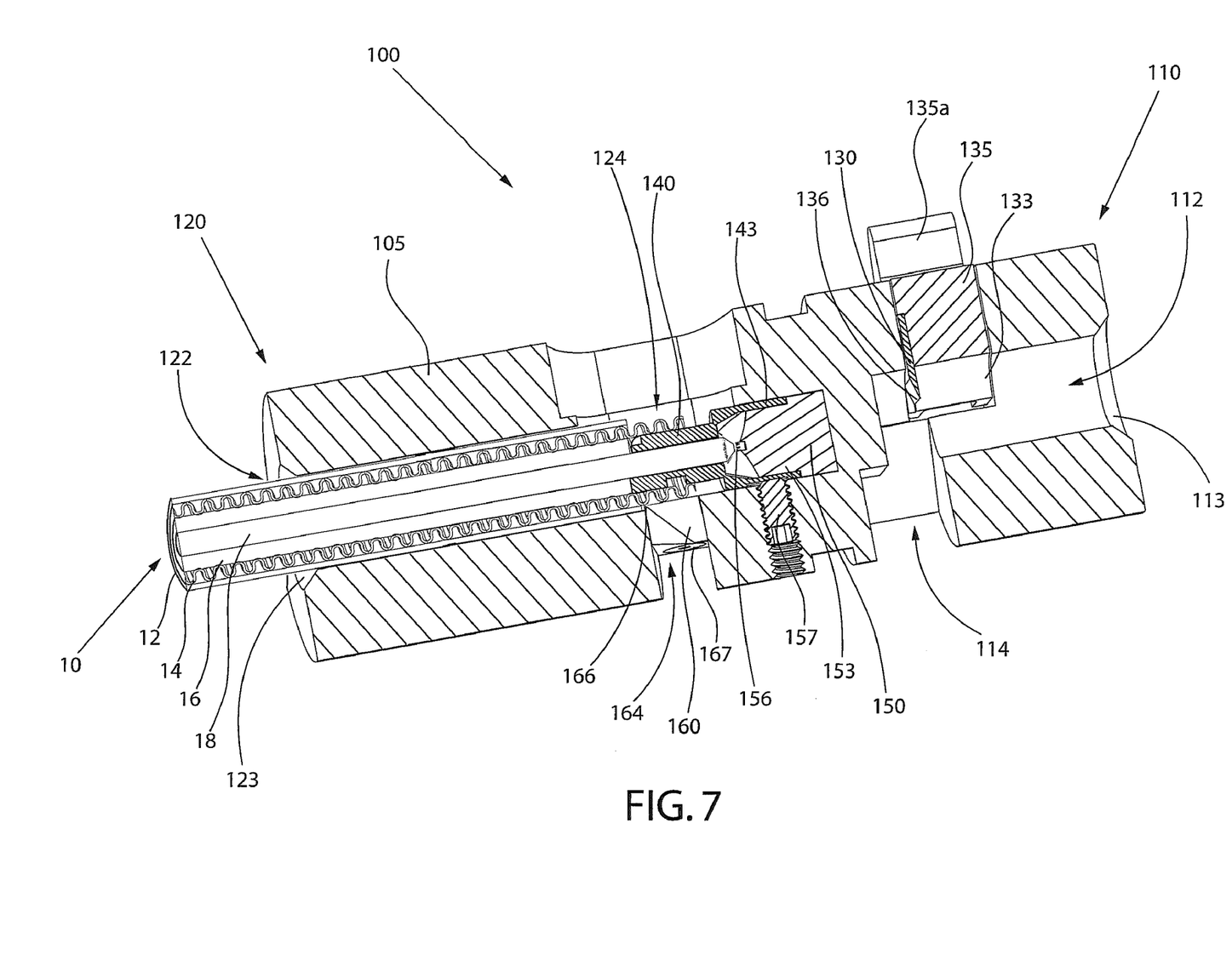
FIG. 7 depicts a perspective cross-section view of an embodiment of a coaxial cable preparation tool having a coaxial cable located a second cavity of the tool following stripping, coring, and chamfering of the cable, in accordance with the present invention.

With continued reference to FIG. 1 and additional reference to FIG. 7, a coaxial cable preparation tool comprises an inner dielectric coring blade 140. The dielectric coring blade 140 is positioned within the second cavity 122. Accordingly, after an end of a coaxial cable 10 has had a portion 17 cut by an outer conductor blade 130 and the discardable cut portion 17 has been removed, then the first cut portion 19 of the end of cable 10 may be inserted into the second cavity 122 until the inner dielectric 16 contacts the coring blade 140. A cutting edge 146 of the coring blade 140 is sharp and shaped to shave and cut the dielectric as the cable 10 is rotated in relation to the coring blade 140. The coring blade 140 should be formed of materials durable and strong enough to repeatedly core the typical inner dielectrics 16 of coaxial cables 10. For instance, the coring blade 140 may be formed of metals, ceramics, hard plastics, composites or other like materials sufficient to effectively core the inner dielectric 16. The exposed center conductor 18 of the cable 10 can extend into a central cavity 142 of the coring blade 140 and may ultimately extend all the way through the coring blade 140 and poke out the other side of the central cavity 142 when the inner dielectric 16 is completely cored. The coring blade 140 may be fluted 149 in order to help shaved or cored portions of the inner dielectric 16 to be expelled and removed from within the cable 10 and the cable preparation tool 100.

A center conductor chamfering member 150 is positioned at the back of the second cavity 122, so that as the inner dielectric 16 is cored the center conductor 18 can contact the chamfering member 150 and be substantially simultaneously chamfered as the cable 10 is rotated in relation to the center conductor chamfering member 150. The chamfering member 150 may include a cutting edge 156 shaped and angled to provide a desired and appropriate chamfer to the center conductor 18. In order to help tool longevity and efficiency a chamfering member 150 should be formed of materials durable and hard enough to repeatedly cut, grind, or otherwise work upon typical center conductor 18 materials, such as copper, to effectively chamfer the center conductors 18. Furthermore, the center conductor chamfering member 150 may be press fit into a back end of the second cavity 122 to help retain the chamfering member 150 in an operable position. Moreover, to further retain the chamfering member 150 in correct position, the chamfering member 150 may be located in a hollow of the coring blade 140, so that an insertable portion 153 of the chamfering member 150 may be press fit against and into a receiving portion 143 of the hollow of the coring blade 140. Thus, the coring blade 140 and the chamfering member may be attached, joined, or otherwise coupled together. Additionally, a set screw 157 may be positioned through a side of the tool body 105 and pressed against the joined coring blade 140 and chamfering member 150 to help secure the two components correctly within the second cavity 122. The set screw 157 may threadably operate with a threaded opening of the tool body 105 and may be driven by typical means such as a hex head.

With continued reference to the drawings, embodiments of a coaxial cable preparation tool 100 include a jacket stripping blade 160. The jacket stripping blade 160 may be positioned at least partially within the second cavity 122 so as to contact the outer jacket 12 of a coaxial cable 10 when the coaxial cable 10 is inserted into the second cavity 122, as depicted in FIG. 7. An opening 164 through the tool body 105 and into the second cavity 122 may facilitate at least partial placement of the jacket stripping blade 160 into the second cavity 122. The jacket stripping blade 160 may include a cutting edge 166 formed to puncture, slice, and cut the outer jacket 12 off of an inserted coaxial cable 10 as the cable 10 is rotated with respect to the jacket stripping blade 160. The cable 10 may be advanced and inserted farther into the second cavity 122 so that as it is rotatably advanced the jacket stripping blade 160 may correspondingly remove portions of the outer jacket 12 of the cable 10. A blade positioning and retaining member 167 may operate to movably position the jacket stripping blade 160 into the second cavity 122, so as to move the blade 160 further into the cavity 122 or extract the blade 160 farther out of the cavity 122. The blade positioning and retaining member 167 may then be utilized to securely retain the jacket stripping blade 160 in an appropriate cutting position corresponding to a depth into the second cavity 122 just sufficient to strip the outer jacket 12 of a coaxial cable 10 inserted into the second cavity. The blade positioning and retaining member 167 may operate with the body 105 to help retain the jacket stripping blade 160. Moreover, the geometry of the opening 164 may also facilitate secure positioning of the jacket stripping blade 160. For example, the opening 164 may be a slot into which the blade 160 is inserted and then securely fastened so that the opening 164 orients the blade 160 for appropriate stripping of an outer jacket 12 of a coaxial cable 10.

Figure 8A:
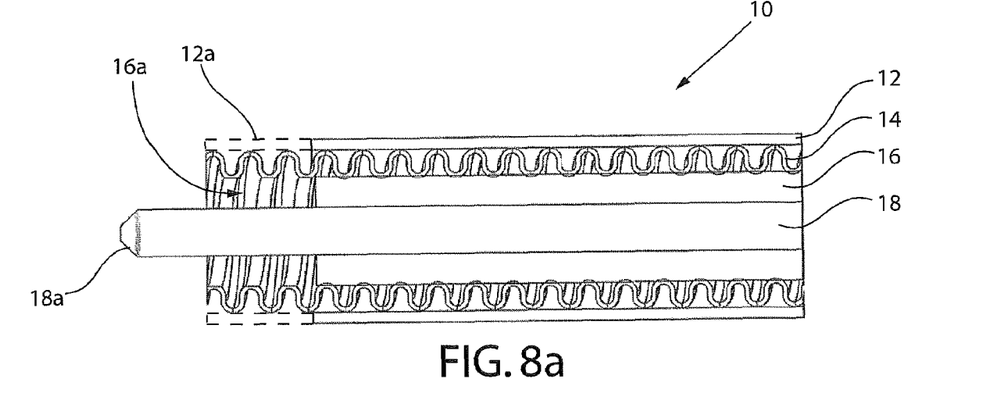
FIG. 8a depicts a side cross-section view of an embodiment of a coaxial cable following coring, stripping and chamfering, in accordance with the present invention.
Figure 8B:
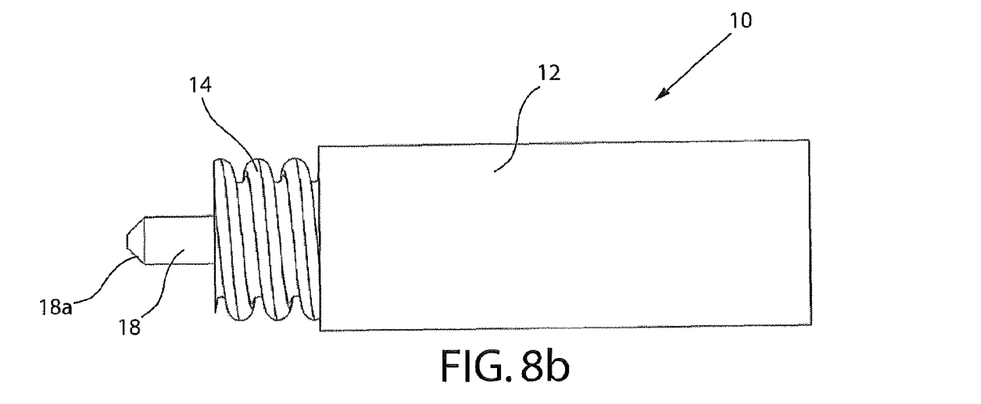
FIG. 8b depicts a side view of an embodiment of a coaxial cable following coring, stripping and chamfering, in accordance with the present invention.
Figure 8C:
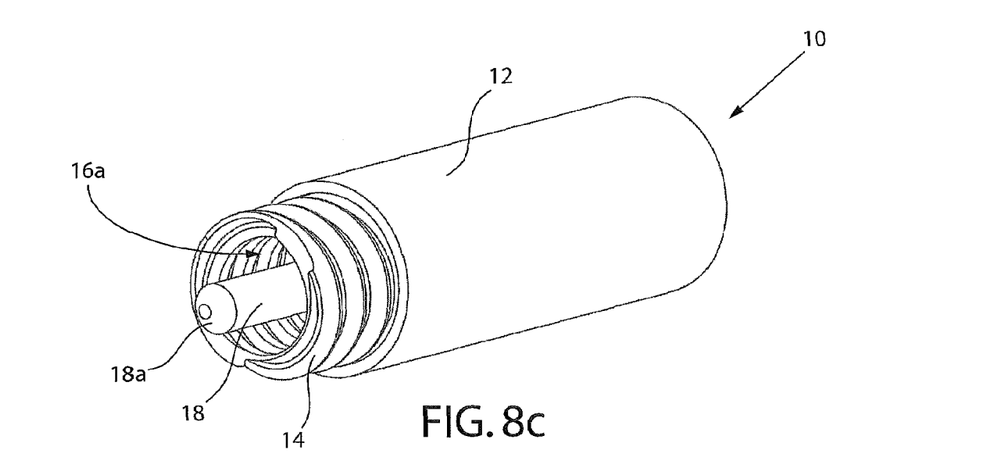
FIG. 8c depicts a perspective view of an embodiment of a coaxial cable following coring, stripping and chamfering, in accordance with the present invention.

With continued reference to FIGS. 1-7 and additional reference to FIGS. 8*a-c*, a coaxial cable 10 may be finally prepared as depicted. Once a discardable portion 17 of the cable has been removed, preferably by operable utilization of the outer conductor blade 130 in the first cavity 112 of the cable preparation tool 100, then the first cut portion 19 of the end of the coaxial cable 10 may be inserted into the second cavity 122 extending from the second end 120 of the tool 100 to finish preparation of the cable 10. The coaxial cable preparation tool 100 includes means for simultaneously chamfering the center conductor 18 of a coaxial cable 10, coring the inner dielectric 16 of the coaxial cable 10, and stripping the outer jacket 12 of the coaxial cable 10. The means may include a chamfering member 150, a coring blade 140, and a jacket stripping blade 160. The cutting edges 146, 156, and 166 of the coring blade 140, chamfering member 150 and jacket stripping blade 160, respectively, may all be located within the second cavity. Hence, when the coaxial cable 10 is inserted, portions of the cable including the inner dielectric 16, center conductor 18, and outer jacket 12 may contact the cutting edges. The cable 10 may then be advanced and rotated in the second cavity to substantially simultaneously core, chamfer, and strip portions thereof. Moreover, a coaxial cable preparation tool may include means for removing stripped, cored, and chamfered portions of the cable from the body. For instance a second view-and-extraction hole 124 may extend through a side of the tool body 105 and strips of the outer jacket 12, cored portions of the inner dielectric 16, or chamfered portions of the center conductor 18 may be extracted from the tool body 105 through the second view-and-extraction hole 124.

Referring still further to the drawings, the jacket stripping blade 160 may strip a portion 12*a* of the outer jacket 12 (see FIG. 8*a*). Moreover, the coring blade 140 may core a portion 16*a* of the inner dielectric 16 (see FIGS. 8*a* and 8*c*). Furthermore, the chamfering member 150 may chamfer a portion 18*a* of the center conductor 18 (see FIGS. 8*a-c*). Accordingly, a prepared coaxial cable 10 may look as depicted in FIG. 8*c*. Those in the art should appreciate that the concept and meaning of simultaneous chamfering, coring, and stripping is applicable to the period of time during which the cable is initially inserted into the second cavity 122 of the preparation tool 100 and then rotatably advanced until the applicable portions of the cable 10 are worked upon by component elements of the tool 100 until the cable 10 is appropriately prepared. Hence, a user may, for practical purposes, finish preparing the cable 10 in a continuous operation without having to separately perform distinct cable 10 preparation tasks.

With reference to FIGS. 1-8*c*, a method of preparing a coaxial cable 10 is depicted. The method comprises a first step of providing a tool body 105. The tool body 10 may have a first cavity 112 and an axially opposed second cavity 122. A second step for preparing a coaxial cable 10 includes inserting an end of the coaxial cable 10 into the first cavity 112 and then compressing an outer conductor blade 130. With the outer conductor blade 130 compressed, the cable 10 and the outer conductor blade 130 may be rotated with respect to each other to cut through a portion 17 of the inserted cable 10. The cut and discardable portion 17 of the cable 10 includes an outer jacket 12, an outer conductor 14, and an inner dielectric 16. The center conductor 18 of the cable 10 is not cut by operation of the blade 130. Once the discardable portion 17 of the cable 10 is cut, the cut portion 17 can be removed and appropriately discarded, thereby defining a first cut portion 19 the end of the coaxial cable 10.

With the end of the coaxial cable 10 cut and the discardable portion 17 removed and discarded, the end of the coaxial cable 10 may look like that depicted in FIG. 6*d*, having a first cut portion 19. Accordingly, a next step of cable preparation includes inserting the first cut portion 19 of the end of the coaxial cable 10 into the second cavity 122 of the tool body 105. Further cable preparation methodology then includes stripping the outer jacket 12 of the cable 10 with a jacket stripping blade 160, coring the inner dielectric 16 of the cable 10 with a coring blade 150, and chamfering the center conductor 18 of the cable 10 with a chamfering member 150. The cable preparation steps of stripping, coring, and chamfering occur substantially simultaneously by rotating the cable 10 and the tool body 105 with respect to each other while the cable 10 is inserted within the second cavity 122. FIG. 7 depicts a perspective cross-section view of an embodiment of a coaxial cable preparation tool 100 having a coaxial cable located a second cavity 122 of the tool body 105 following stripping, coring, and chamfering of the cable 10.

During or following the substantially simultaneous operations of stripping, coring, and chamfering, the stripped, cored, or chamfered portions of the cable 10 may be removed through an opening 124 of the tool body 105. Once the cable has been finally prepared through the substantially simultaneous operations of stripping, coring, and chamfering then the cable 10 may be extracted from the second cavity 122 of the tool body 105, wherein the cable 10 will be prepared and will look similar to that depicted in FIG. 8c. As such, embodiments of a coaxial cable preparation tool 100 afford efficient and effective coaxial cable 10 preparation.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

We claim:

1. A coaxial cable preparation tool comprising:
   a body, having a first end and a second end, the first end including a first cavity configured to accommodate insertion of a coaxial cable therein;
   an outer conductor blade, pivotally mounted near the first end of the body and movably operable with the body to cut an outer jacket, an outer conductor, and an inner dielectric of the cable when the cable is inserted into the first cavity, defining a first cut portion with the outer jacket, outer conductor and inner dielectric removed from the cable;
   a center conductor chamfering member, positioned at the back of a second cavity, the second cavity extending from the second end of the body;
   a dielectric coring blade, positioned within the second cavity; and
   a jacket stripping blade, positioned at least partially within the second cavity, wherein upon insertion of the first cut portion into the second cavity and rotating the body with respect to the cable, a chamfer is defined on an end of the center conductor substantially simultaneously with the removal of a portion of the inner dielectric and a portion of the outer jacket.

2. The coaxial cable preparation tool of claim 1 further wherein the outer conductor blade is spring biased and operable with the body to move between a first non-cutting position to a second cutting position.

3. The coaxial cable preparation tool of claim 1, wherein a first view-and-extraction hole opens through a side of the body into the first cavity.

4. The coaxial cable preparation tool of claim 1, wherein a second view-and-extraction hole opens through a side of the body into the second cavity.

5. The coaxial cable preparation tool of claim 1, wherein the chamfering member is located in a hollow of the coring blade, so that an insertable portion of the chamfering member is press fit against and into a receiving portion of the hollow of the coring blade.

6. The coaxial cable preparation tool of claim 5, wherein a set screw is positioned through a side of the body and pressed against the joined coring blade and chamfering member to help secure the two components correctly within the second cavity.

7. The coaxial cable preparation tool of claim 1, wherein the first cavity and the second cavity are opposed to each other about a central axis of the body.

8. A coaxial cable preparation tool comprising:
   a body, having a first cavity extending axially from a first end of the body, wherein an outer conductor blade is operably connected to the body, the outer conductor blade being movable from a first non-cutting position external to the first cavity to a second cutting position wherein the outer conductor blade extends to a depth within the first cavity sufficient to cut an outer jacket, an outer conductor, and an inner dielectric of a coaxial cable inserted into the first cavity;
   the body having a second cavity extending axially from a second end of the body, wherein a center conductor chamfering member is located at the back of the second cavity, a coring blade is located within the second cavity, and a jacket stripping blade extends partially into the second cavity.

9. The coaxial cable preparation tool of claim 8, wherein the jacket stripping blade is secured by blade positioning and retaining member utilized to securely retain the jacket stripping blade in an appropriate cutting position corresponding to a depth into the second cavity just sufficient to strip the outer jacket of the coaxial cable as inserted into the second cavity.

10. The coaxial cable preparation tool of claim 8, wherein the outer conductor blade is attached to a chopping arm hingedly attached to the body to facilitate operation of the blade through movement between the first non-cutting and second cutting positions.

11. The coaxial cable preparation tool of claim 10, wherein the chopping arm is spring-loaded.

12. The coaxial cable preparation tool of claim 10, wherein the chopping arm includes lever element so that a user can more easily grasp and move the chopping arm and attached outer conductor blade.

13. The coaxial cable preparation tool of claim 8, wherein the body is generally cylindrically shaped.

14. The coaxial cable preparation tool of claim 8, wherein the body is integrally formed of a singe piece of material.

15. A coaxial cable preparation tool comprising:
   a body, having a first end and an opposing second end, the first end including a first cavity and the second end including a second cavity;
   an outer conductor blade, located perpendicular to an axis of the body, the outer conductor blade operable to move from a non-cutting position external to the first cavity to a cutting position, wherein at least a portion of the outer conductor blade resides within the first cavity; and
   means for simultaneously chamfering a center conductor of a coaxial cable, coring an inner dielectric of the coaxial cable, and stripping an outer jacket of the coaxial cable, the means located within the second cavity.

16. The coaxial cable preparation tool of claim 15 further including means for removing stripped, cored, and chamfered portions of the cable from the body.

* * * * *